United States Patent
Hill

(10) Patent No.: US 7,972,659 B2
(45) Date of Patent: Jul. 5, 2011

(54) METHOD OF APPLYING SILANES TO METAL IN AN OIL BATH CONTAINING A CONTROLLED AMOUNT OF WATER

(75) Inventor: Michael Hill, Conway, AR (US)

(73) Assignee: ECOSIL Technologies LLC, Fairfield, OH (US)

( * ) Notice: Subject to any disclaimer, the term of this patent is extended or adjusted under 35 U.S.C. 154(b) by 670 days.

(21) Appl. No.: 12/048,445

(22) Filed: Mar. 14, 2008

(65) Prior Publication Data

US 2009/0229724 A1    Sep. 17, 2009

(51) Int. Cl.
*B05D 1/18* (2006.01)
(52) U.S. Cl. ............... 427/434.6; 427/434.2; 427/430.1; 427/435; 152/451
(58) Field of Classification Search ............... 427/248.1, 427/372.2, 402, 404
See application file for complete search history.

(56) References Cited

U.S. PATENT DOCUMENTS

| | | |
|---|---|---|
| 3,088,847 A | 5/1963 | Pines |
| 3,398,045 A | 8/1968 | Clayton |
| 3,894,877 A | 7/1975 | Nelson |
| 4,348,517 A | 9/1982 | Chakravarti |
| 4,544,581 A * | 10/1985 | Pelloski ...................... 427/383.7 |
| 4,672,040 A * | 6/1987 | Josephson ...................... 436/526 |
| 4,948,485 A | 8/1990 | Wallsten et al. |
| 5,108,793 A | 4/1992 | van Ooij et al. |
| 5,200,275 A | 4/1993 | van Ooij et al. |
| 5,204,219 A | 4/1993 | van Ooij et al. |
| 5,292,549 A | 3/1994 | van Ooij et al. |
| 5,322,713 A | 6/1994 | van Ooij et al. |
| 5,326,594 A | 7/1994 | Sabata et al. |
| 5,433,976 A | 7/1995 | van Ooij et al. |
| 5,455,080 A | 10/1995 | van Ooij |
| 5,478,655 A | 12/1995 | Sabata et al. |
| 5,498,481 A | 3/1996 | van Ooij |
| 5,532,314 A | 7/1996 | Sexsmith |
| 5,539,031 A | 7/1996 | van Ooij |
| 5,620,743 A | 4/1997 | Harth et al. |
| 5,750,197 A | 5/1998 | van Ooij et al. |
| 5,759,629 A | 6/1998 | van Ooij et al. |
| 5,958,161 A | 9/1999 | Grimberg et al. |
| 6,071,566 A | 6/2000 | Brown et al. |
| 6,132,808 A | 10/2000 | Brown et al. |

(Continued)

FOREIGN PATENT DOCUMENTS

DE    10015308 A1    10/2001

(Continued)

OTHER PUBLICATIONS

Jang J, Kim K, Corrosion Protection of Epoxy-Coated Steel Using Different Silane Coupling Agents, Journal of Applied Polymer Science, vol. 71, 585-593 (1999).

(Continued)

*Primary Examiner* — David Turocy
(74) *Attorney, Agent, or Firm* — Wood, Herron & Evans, LLP

(57) ABSTRACT

Organofunctional silanes are applied to metal surfaces using an oil bath. Metal is immersed in an oil bath containing approximately 2% silane and an oil dispersible hygroscopic liquid, such as glycerol. In one embodiment, the metal is a tire cord. Water vapor entrained in a carrier gas can also be bubbled into the oil silane bath.

12 Claims, 1 Drawing Sheet

U.S. PATENT DOCUMENTS

| | | | |
|---|---|---|---|
| 6,156,114 | A | 12/2000 | Bell et al. |
| 6,261,638 | B1 | 7/2001 | van Ooij et al. |
| 6,268,421 | B1 | 7/2001 | Dittrich et al. |
| 6,361,592 | B1 | 3/2002 | Song et al. |
| 6,383,301 | B1 | 5/2002 | Bell et al. |
| 6,395,331 | B1 * | 5/2002 | Yan et al. ............... 427/169 |
| 6,409,874 | B1 | 6/2002 | Van Der Aar et al. |
| 6,416,869 | B1 | 7/2002 | van Ooij et al. |
| 6,432,191 | B2 | 8/2002 | Schutt |
| 6,475,300 | B2 | 11/2002 | Shimakura et al. |
| 6,560,079 | B1 | 5/2003 | Hirsh et al. |
| 6,756,079 | B2 | 6/2004 | van Ooij et al. |
| 6,827,981 | B2 | 12/2004 | van Ooij et al. |
| 6,919,469 | B2 | 7/2005 | van Ooij et al. |
| 6,955,728 | B1 | 10/2005 | van Ooij et al. |
| 2003/0157391 | A1 | 8/2003 | Coleman et al. |
| 2004/0028829 | A1 * | 2/2004 | van Ooij et al. ............ 427/387 |
| 2004/0062873 | A1 | 4/2004 | Jung et al. |
| 2004/0138072 | A1 * | 7/2004 | Levy ..................... 508/154 |
| 2005/0058843 | A1 | 3/2005 | van Ooij et al. |
| 2005/0079364 | A1 | 4/2005 | van Ooij et al. |
| 2005/0179011 | A1 | 8/2005 | van Ooij et al. |
| 2006/0188657 | A1 * | 8/2006 | Kimura et al. ............ 427/407.2 |
| 2007/0059448 | A1 * | 3/2007 | Smith et al. ................ 427/299 |

FOREIGN PATENT DOCUMENTS

| | | |
|---|---|---|
| DE | 10308237 | 9/2004 |
| EP | 816420 A1 | 1/1998 |
| EP | 1130131 A2 | 5/2001 |
| JP | 47-029393 A | 8/1972 |
| JP | 03-164239 A | 7/1991 |
| JP | 08-337788 A | 12/1996 |
| WO | 9611247 A1 | 4/1996 |
| WO | 0038844 A1 | 7/2000 |
| WO | 0039356 A1 | 7/2000 |
| WO | WO 0038844 A1 * | 7/2000 |
| WO | 00/63303 A1 | 10/2000 |
| WO | 00/63462 | 10/2000 |
| WO | 2004009717 | 1/2004 |
| WO | 2004009717 | 2/2004 |
| WO | 2005035364 A2 | 4/2005 |

OTHER PUBLICATIONS

Jayaseelan SK, van Ooji WJ, Rubber-To-Metal Bonding by Silanes, pp. 1-14, Proceedings of Rubber Bonding 2000 Conference, May 15-16, 2000.

van Ooji WJ, Jayaseelan SK, Bonding Metals to Rubber Using Functional and Nonfunctional Silanes, 6 pp., Extended abstract of paper presented at Adhesion 99', Combridge, UK, Sep. 15-17, 1999.

van Ooji WJ, Van der Aar CPJ, Roseboom F, Bantjes A, Bonding Rubber to Metals by Organofunctional and Non-Functional Silanes, 3 pp., Extended Abstract of Paper Presented at Euradh '98—4th European Conference on Adhesion, WCARP-1—1st World Congress on Adhesion and Related Phenomena, Garmisch-Partenkirchen, Germany, Sep. 6-11, 1998.

van Ooji WJ, Rubber-Brass Bonding, pp. 1-22 and 8 sheets of figures, Chapter in Rubber Handbook RAPRA Technology, 1999.

van Ooji, Zhu DQ, Prasad G, Jayaseelan S, Fu Y, Teredesai N, Silane Based Chromate Replacements for Corrosion Control, Paint Adhesion, and Rubber Bonding, pp. 386-396, Surface Engineering, vol. 6, No. 5, 2000.

van Ooji WJ, Jayaseeian SK, Stacy M, The Use of Organofunctional Silanes for Bonding Rubber to Metals, pp. 1-6, Paper to be presented at RubTech Expo 2002, new Delhi, India, Nov. 28-30, 2002.

Translation of JP 03-164239 A (no date).

Machine translation of JP 08-337788 A, provided by the JPO website (no date).

Partial translation of JP 08-337788 A, provided by the USPTO translations branch (no date).

Translation of JP 47-029393 (no date).

Office Action mailed Oct. 27, 2010 regarding U.S. Appl. No. 12/717,590.

* cited by examiner

METHOD OF APPLYING SILANES TO METAL IN AN OIL BATH CONTAINING A CONTROLLED AMOUNT OF WATER

BACKGROUND OF THE INVENTION

Silanes are applied to metal surfaces for several purposes including corrosion resistance and adhesion promotion. As an example, steel tire cord must adhere to the rubber in order to function properly. Steel does not bond well to rubber. To improve adhesion, the steel tire cord has been coated with a layer of brass. During the vulcanization process, the rubber forms a chemical bond with the brass. This rubber/metal bond is formed only with sulfur vulcanized rubber which requires a relatively high sulfur level, greater than 4 phr, as well as certain accelerators, i.e., a delayed action sulfonamide and cobalt in the form of cobalt naphthenate to achieve proper cure and good adhesion, as well as zinc oxide. The cobalt improves the stability of the rubber-brass bond. However, it also has a negative effect on the stability of the rubber network in that it accelerates reversion in the presence of oxygen at elevated temperatures. The increased sulfur and cobalt are believed to be necessary in order to achieve a satisfactory bond between the tire cord and the rubber.

It has been proposed to treat tire cord with various silane compositions in order to improve adhesion. This is disclosed, for example, in van Ooij U.S. Pat. No. 6,416,869; U.S. Pat. No. 6,756,079; and U.S. Pat. No. 6,919,469. The processes disclosed in these patents have various issues. One issue is the efficient application of the silane onto the tire cord. Some of these applications require that the silane be baked onto the tire cord for adequate adhesion.

Pending application Ser. No. 11/366,235, entitled "Method of Applying Silane Coating in Metal Compositions", filed Mar. 2, 2006, and published Mar. 15, 2007, discloses an improved method of applying silanes to tire cords. The disclosure of this is hereby incorporated by reference. The present invention is intended to improve on the methods disclosed in this application.

SUMMARY OF THE INVENTION

The present invention is premised on the realization that metal such as tire cord can be coated with a silane coating by running the metal through an oil bath containing a small percentage of silane in combination with a controlled amount of water in excess of ambient moisture.

In one embodiment, metal such as tire cord can be coated with a silane coating by running the metal through an oil bath containing a small percentage of silane in combination with an oil dispersible hygroscopic composition.

The hygroscopic composition can be any hygroscopic composition that is dispersible in oil and has some hydrophilic component. Suitable compositions include oil-dispersible compositions that include a hydroxyl group such as glycerol.

In another embodiment, a moisture-laden gas can be passed through the oil to provide sufficient water for the silane to hydrolyze and bond to the tire cord. Both embodiments can be practiced together.

The silane can be any organofunctional silane. Such silanes are known to improve adhesion and prevent corrosion. For tire cords, the silane can be any organosilane that improves rubber/metal adhesion. These can include, for example, vinylsilanes, aminosilanes, polysuflidesilanes, as well as blends of organosilanes. For sulfur cure rubber systems the silane can be a blend of an amino silane and a polysulfide silane.

This, in turn, allows the rubber formulation, in particular the skim rubber formulation, to have less sulfur and no cobalt or zinc oxide, thereby improving the performance characteristics, such as heat aging, of the formed tire. This also significantly reduces the cost of the rubber formulation.

The objects and advantages of the present invention will be further appreciated in light of the following detailed description and drawing, in which:

DETAILED DESCRIPTION OF THE INVENTION

Figure 1:
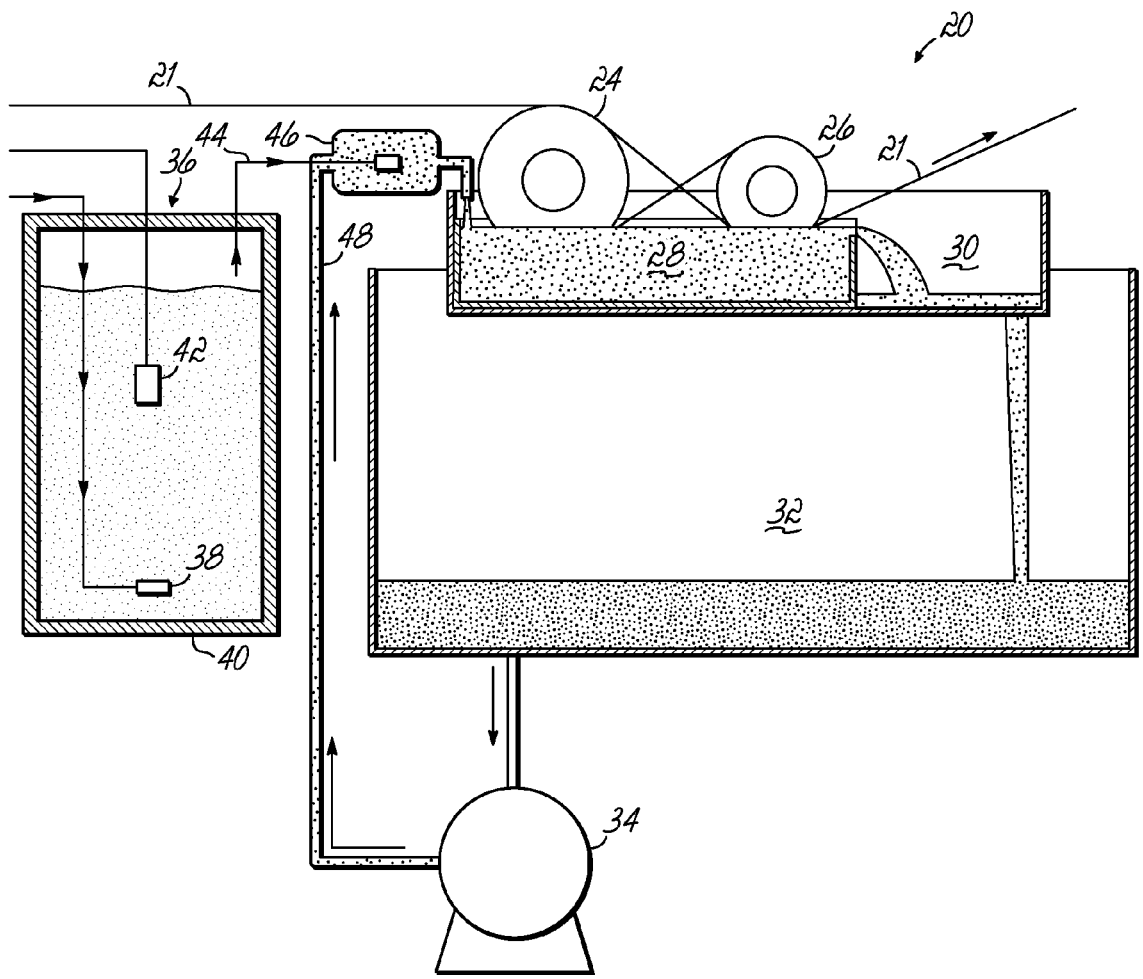
FIG. 1 is a diagrammatic depiction, partially broken away, of the apparatus used to coat tire cord.

According to the present invention, metal is coated with an organofunctional silane utilizing an oil bath containing the silane. The organofunctional silane can be any organofunctional silane. These may be added to provide corrosion resistance or as an adhesion promoter, in particular a metal-rubber adhesion promoter. In one embodiment, the metal is a wire, and in particular, steel, brass coated steel or zinc coated steel, particularly tire cord. The rubber can be any rubber that incorporates metal such as tires and conveyor belts.

Typical organofunctional silanes used in these applications include vinyl silanes, aminosilanes, and polysulfide silanes, as well as mixtures thereof. Such silanes are disclosed in U.S. Pat. No. 6,416,869; U.S. Pat. No. 6,756,079; PCT application WO2004/009717; pending application U.S. 2005/0058843; and U.S. Pat. No. 6,919,569, the disclosures of which are hereby incorporated by reference.

One preferred silane coating composition for sulfur cured rubber systems is a blend of a bis-silyl amino silane and a bis-silyl polysulfur silane, with the ratio of bis-silyl amino silane to bis-silyl polysulfur silane from about 1:10 to about 10:1, and, in one embodiment, 1:3 by weight.

Exemplary bis-silyl aminosilanes that may be used in the present invention include bis-(trimethoxysilylpropyl) amine (which is sold under the trade name Silquest® A-1170 by Momentive Performance Material); and bis-(trimethoxysilylpropyl) ethylene diamine.

Particular bis-silyl polysulfur silanes include bis-(triethoxysilylpropyl) sulfides having 2 to 10 sulfur atoms. One particular compound is bis-(triethoxysilylpropyl) tetrasulfide (also referred to as bis-(triethoxysilylpropyl sulfane, or "TESPT"). Commercially available forms of TESPT, however, are actually mixtures of bis-(triethoxysilylpropyl) sulfides having 2 to 10 sulfur atoms. In other words, these commercially available forms of TESPT have a distribution of sulfide chain lengths, with the $S_3$ and $S_4$ sulfides predominating. Another suitable silane is (triethoxysilylpropyl)tetra sulfane, also referred to as Si-69, sold by Evonic Industries AG.

A controlled amount of water in excess of ambient water is added to the bath. Sufficient water is required to allow the silane to hydrolyze and bond to the metal surface. This is preferably added without the addition of resin.

In one embodiment, the silane composition is applied to the metal or tire cord in an oil bath containing a hygroscopic oil dispersible compound. The hygroscopic material must not react at use concentrations with the silane causing it to precipitate out of solution and is preferably an oxygen-containing compound such as an alcohol, fatty acid or ester, which, when mixed with the oil, will not separate. The amount of hygroscopic compound added to the composition depends on its hydrophilicity. The more hydrophilic the compound, the less material is required. Suitable hygroscopic compounds for use in the present invention include ethylene and propylene glycol, glycerol, higher molecular weight alcohols and fatty acids. One particular composition suitable for use in the present invention is glycerol.

Glycerol can be added to the composition in a ratio of 1:3 to 3:1 by weight of the silane composition. If too much hygroscopic material is added, the silane will tend to react immediately and precipitate out of solution. Therefore, with the more hydrophilic materials, such as the glycols, less hygroscopic material should be added to the oil bath. If too little water is present, the adhesion of the silane to the metal is reduced.

To further facilitate the introduction of moisture into the oil bath, water vapor entrained in a carrier gas can be bubbled into the oil bath. The carrier gas can be any inert gas, with air or nitrogen being preferred. The gas is simply bubbled through water at room temperature or higher to entrain water vapor within the gas, which is then bubbled into the oil bath. This is required only when the atmospheric moisture is relatively low, and can be omitted in warm, humid environments.

The oil should be a non-VOC lubricating oil and can be any mineral, animal or vegetable based oil. Any oil that can be used in a tire cord manufacturing process can be used in the present invention. One such oil is a heavily hydro treated naphthenic having a viscosity of 60 SUS @ 100° F. CAS 647-52-5.

The oil silane coating composition is prepared by first mixing the hygroscopic material with the oil, with agitation. The silane mixture is then formulated and added to the hygroscopic material-oil blend, again with agitation. The coating composition is then ready to use.

Prior to coating the metal in the oil bath, the metal should be cleaned with alkaline cleaner and rinsed with water. A solution of one molar sodium hydroxide has been found to be particularly useful to pretreat the metal.

The temperature of the oil bath will generally be about room temperature, but can be raised up to the boiling point of the oil. The cord should be in oil for 0.1 to 10 seconds, preferably 1-2 seconds. This is controlled by controlling the path through the oil, as well as the speed of the cord.

After being coated, the cord is simply rolled onto a spool and then can subsequently used to form belting for tires, conveyer belts, and the like. Typical rubber formulations are disclosed in U.S. Pat. No. 6,919,469, the disclosure of which is incorporated herein by reference.

Figure 2:
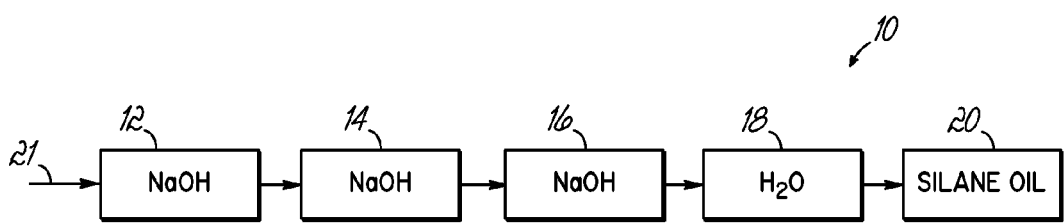
FIG. 2 is a diagrammatic depiction of the present invention.

As depicted in FIGS. 1 and 2, tire cord coater 10 includes 5 baths 12,14,16,18,20. The first three baths 12,14,16 contain a 1 M solution of NaOH. The number of NaOH baths can be reduced if longer baths are used. The fourth bath 18 is a water rinse. The fifth bath 20 is the silane application bath. Baths 16,18, and 20 are equipped with air wipes (not shown) to prevent carryover of bath contents. Each bath has two capstans. The capstans are all similar and only capstans in bath 20 are depicted in detail in FIG. 1. The tire cord 21 starts at the top of the large capstan 24 and makes eight passes in a FIG. 8 pattern between the large capstan 24 and the small capstan 26 before exiting from the bottom of the small capstan 26. All baths have a notched weir (not shown) that keeps the capstans partially submerged in liquid in trough 28. During operation, liquid continually flows from trough 28 to drain section 30 into a sump 32. The liquid is forced by pump 34 back into trough 28.

Coating bath 20 also includes an air infusion section 36, which is not present in the other baths. Compressed air is forced through air stone 38 into a closed water reservoir 40. A heater 42 is located in the water reservoir to keep the water at or above room temperature (20-22° C.). Moisture enriched gas is forced through line 44 into a bulb 46 in oil return line 48. Pump 34 forces oil into bulb 46 and back to trough section 28. The moisture laden air mixes with oil in bulb 46, adding moisture to the oil.

Example

Using the apparatus shown in the Figures, tire cord was cleaned and coated with an oil silane blend. A sodium hydroxide solution for the first three baths was prepared by mixing 14.2 kg of water with 1.24 kg of 50% sodium hydroxide solution. This was added to baths 12, 14 and 16, and bath 18 was filled with water.

The silane mixture for bath 20 was prepared by combining 10.68 kg of stranding oil with 162 g of glycerol, with agitation. Separately, 486 g of Si-69 was blended with 162 g of Silquest A-1170. The silane solution was then blended with the oil/glycerol mixture, again with agitation. This was added to bath 20.

The cord was threaded through the 5 baths, the first three sodium hydroxide baths followed by the water bath and then the silane/oil bath. The cord was moved through the apparatus at a speed of 90 m/min. The coated tire cord was then tested for total adhesion and coverage. Total adhesion is the measure of force required to pull a wire sample out of a ½ inch thick block of vulcanized rubber (ASTM D-2229). The coverage is an estimate of the percentage of cord sample that remains covered in rubber after it is pulled from the block.

Typical test results are shown below.

| Force (Kgf) | Coverage | Force (Kgf) | Coverage | Force (Kgf) | Coverage |
|---|---|---|---|---|---|
| Spool #1 | | Spool #2 | | Spool #3 | |
| 45.8 | 95 | 46.8 | 95 | 46.6 | 100 |
| 49.8 | 95 | 48.8 | 95 | 44.3 | 100 |
| 47.9 | 95 | 41.0 | 95 | 48.4 | 100 |
| 41.1 | 90 | 44.9 | 95 | 44.7 | 100 |
| 45.3 | 95 | 47.6 | 95 | 41.8 | 100 |
| 50.1 | 95 | 39.7 | 90 | 49.4 | 100 |
| 45.6 | 95 | 47.8 | 95 | 44.0 | Broke |
| 47.9 | 90 | 47.6 | 95 | 48.5 | 100 |
| 47.4 | 95 | 54.2 | 90 | 48.1 | 100 |
| 49.5 | 90 | 42.6 | 95 | 49.5 | 95 |
| 48.9 | 95 | 44.2 | 95 | 47.8 | 100 |
| 48.4 | 95 | 50.9 | 95 | 48.0 | 100 |
| Averages | | Averages | | Averages | |
| 47.3 | 93 | 46.3 | 94 | 46.8 | 99 |

The addition of the hygroscopic material to the oil bath provides added water to enable the silane to react. This, in turn, increases the adhesion of the silane to the metal, and, thus, the entire cord to the rubber, which, of course, is very desirable for the end use application in tires or transmission belts, or the like. Coverage is also improved.

This has been a description of the present invention along with the preferred method of practicing the present invention. However, the invention itself should only be defined by the appended claims, WHEREIN I CLAIM:

What is claimed is:

1. A method of applying a silane coating onto metal tire cord comprising passing said metal tire cord through an oil mixture, said oil mixture comprising a blend of an oil, and an organofunctional silane including a polysulfur silane;

adding an amount of water effective to improve the adhesion of said organofunctional silane to said metal substrate by bubbling water vapor through said oil mixture.

2. The method claimed in claim 1 wherein said oil mixture includes a hygroscopic material.

3. The method claimed in claim 2 wherein said organofunctional silane further includes an amino silane.

4. The method claimed in claim 3 wherein in said amino silane is a bis-aminosilane.

5. The method claimed in claim 3 wherein said organofunctional silane has a ratio by weight of amino silane:polysulfur silane of 1:3 to 3:1.

6. The method claimed in claim 2 wherein said organofunctional silane comprises at least about 2% by weight of said oil mixture.

7. The method claimed in claim 2 wherein said hygroscopic compound is glycerol.

8. The method claimed in claim 1 wherein unhydrolyzed organofunctional silane is added to said oil mixture.

9. The method claimed in claim 1 wherein said oil is a naphthenic lubricating oil.

10. The method claimed in claim 1 wherein said oil is a paraffinic lubricating oil.

11. The method claimed in claim 1 wherein said metal substrate is cleaned with an alkaline cleaner.

12. A method of coating a brass tire cord comprising running said cord through an oil bath containing at least one silane and bubbling water vapor entrained in air through said oil bath.

* * * * *